UNITED STATES PATENT OFFICE.

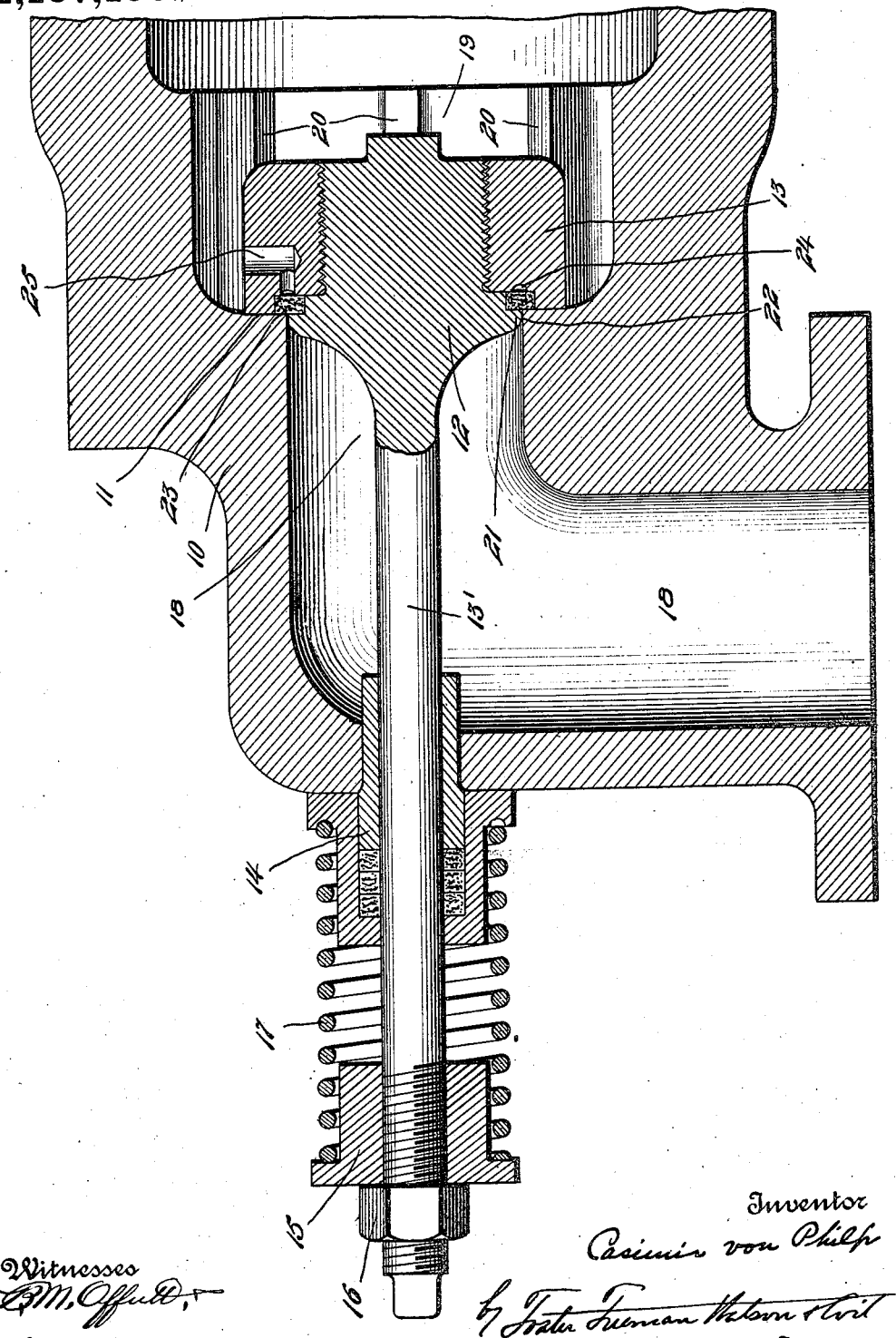

CASIMIR von PHILP, OF SOUTH BETHLEHEM, PENNSYLVANIA, ASSIGNOR TO BETHLEHEM STEEL COMPANY, OF SOUTH BETHLEHEM, PENNSYLVANIA, A CORPORATION OF PENNSYLVANIA.

VALVE.

1,157,196.　　　　Specification of Letters Patent.　　Patented Oct. 19, 1915.

Application filed January 2, 1913. Serial No. 739,853.

*To all whom it may concern:*

Be it known that I, CASIMIR VON PHILP, a citizen of the United States, and resident of South Bethlehem, county of Northampton, State of Pennsylvania, have invented certain new and useful Improvements in Valves, of which the following is a specification.

This invention relates to valves and more particularly to valves for extremely high pressures, such as are used in connection with heavy hydraulic machinery.

The invention has reference to the packing means for the valve and has for its object the provision of a packing means which is extremely simple in construction, durable and thoroughly effective and reliable in operation.

In valves used heretofore in connection with heavy hydraulic machinery leather packings have been employed but these packings have been of such a character that they have not been durable and they have also given trouble on account of becoming displaced and holding the valve off its seat.

In my invention I have provided a simple leather or other flexible packing ring which is suitably housed and which is forced against the packing faces by the fluid pressure at one side of the valve. I have also arranged the parts so that the packing ring is not subjected to the load on the valve.

I have illustrated one form of my invention in the accompanying drawing which is a longitudinal section through a check valve.

In this drawing 10 indicates the casing or seat member having a seat 11 for a valve member comprising a head 12 having screwed thereon a nut 13. The head 12 has secured thereto the stem 13′ which passes through a suitable stuffing box 14 in the casing 10 and has secured on its outer end a collar 15 which engages a nut 16 whereby the collar is held in position. A spring 17 is arranged between the casing 10 and the collar 15 and normally tends to draw the stem 13′ outwardly through the stuffing box.

The casing 10 has a passage 18 on one side of the valve member and on the opposite side thereof a chamber 19 in which are arranged the usual radial ribs 20 which guide the valve member in its movements.

The head 12 is provided with a shoulder 21 which closely fits the passage 18 and forms with the wall of said passage a restricted annular port or passage 22 which is closed by the packing ring 23, when the valve is in the closed position. The ring 23 is arranged in a suitable recess in the nut 13, the open side of which recess is partially closed by the shoulder 21. An annular space or groove 24 is provided in the nut 13 at the back of the packing ring 23, this space communicating with the chamber 19 by means of one or more ports 25.

As thus constructed the valve is adapted to normally permit the fluid to flow from the passage 18 into the chamber 19 and prevent flow in the reverse direction. The valve is shown in the drawing in the closed position and when the pressure in the chamber 19 is reduced below that in the passage 18, the valve will be opened against the tension of the spring 17 and thereby permit the fluid to flow through the valve. When the pressure is equalized on both sides of the valve, the spring 17 moves the valve to closed position, in which position the nut 13 positively engages the seat 11. Where extremely high pressures are used it is impracticable to maintain a non-leaking joint between engaging metal surfaces and in order to prevent back flow from the chamber 19 through the passage 22 into the passage 18, the flexible packing 23 has been provided, this packing being forced against a surface on the shoulder 21 and also against the surface of the seat 11 which is in alinement with the packing surface on the shoulder, by the pressure in the chamber 19 which acts through the port 25 and the groove 24 on the back of the packing ring.

It will be observed that the ring 23 covers the passage 22 and, on account of being forced against packing surfaces on opposite sides of this passage, leakage into the passage from both directions is prevented.

It will be noted that my improved valve is provided with large bearing surfaces both for the valve proper and the packing and that these surfaces are in planes at right angles to the axis of the valve. It will also be noted that the packing is rectangular in cross section and has substantially equal portions bearing upon a flat annular seat on the casing and a flat annular seat on the valve, such seats being substantially in the same plane and separated so slightly that the packing can not be forced in between them. The pressures are normal to the valve seat and packing seats and very high pressures are sustained without leakage or distortion of the packing or undue strain upon any of the parts of the valve, and the valve seat being outside of the passage 18 provides a smooth unobstructed channel to the chamber 19.

The construction above described has proved very efficient and durable in service and is comparatively inexpensive since it is unnecessary to provide any accurately fitting surfaces, in order to prevent leakage.

It will be obvious to those skilled in the art that the novel features of my invention may be applied to other types of valves than that illustrated and that the minor details of construction may be varied, within the scope of the appended claims, and therefore I do not wish to be limited to the exact construction shown and described.

Having described the invention what is claimed and desired to be secured by Letters-Patent is, 1. In a high pressure fluid valve structure, the combination with a casing having a valve chamber, a passage leading into the chamber, and an annular valve seat in said chamber surrounding the passage, of a valve having a portion within and nearly filling the mouth of said passage, and an annular portion within the chamber adapted to rest on said seat, a packing ring of flexible material between said portions, the outer portion of the packing ring being arranged to rest on the valve seat and the inner portion being seated on that part of the valve within the passage, the valve and packing seats being in planes at right angles to the axis of the valve and the valve being constructed to admit pressure to the back of the packing.

2. In a high pressure valve structure, the combination with a casing having a valve chamber, a passage leading into the chamber and an annular valve seat in said chamber surrounding the passage, of a valve having a portion within and nearly filling the mouth of said passage, and an annular portion within the chamber adapted to rest on said seat, a flexible packing ring of rectangular cross section within said annular portion, the outer portion of the packing ring having a seat on the casing, and the inner portion being seated on that part of the valve within the passage, all valve and packing seats being in planes at right angles to the axis of the valve and the valve being constructed to admit pressure to the back of the packing.

3. In a high pressure valve structure, the combination with a casing having a valve chamber, a passage leading into the chamber and an annular valve seat in said chamber surrounding the passage, of a valve having a portion within and nearly filling the mouth of said passage, and an annular nut portion 13 having threaded engagement with the valve body and adapted to rest on said seat, the valve body and nut portion having between them an annular space of rectangular cross section, and a packing ring of flexible material loosely fitted in said annular space, the outer portion of the packing ring being arranged to rest on a seat surrounding the mouth of the passage and the inner portion being seated on that part of the valve within the passage, the valve and packing seats being in planes at right angles to the axis of the valve and the valve being constructed to admit pressure to the back of the packing.

In testimony whereof I affix my signature in presence of two witnesses.

CASIMIR von PHILP.

Witnesses:
C. G. NORDSTROM,
C. R. DEIBERT.